(12) United States Patent
Christiansen et al.

(10) Patent No.: US 7,827,405 B2
(45) Date of Patent: Nov. 2, 2010

(54) MECHANISM FOR UTILIZING KERBEROS FEATURES BY AN NTLM COMPLIANT ENTITY

(75) Inventors: David Christiansen, Woodinville, WA (US); Liqiang Zhu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 11/624,909

(22) Filed: Jan. 19, 2007

(65) Prior Publication Data

US 2008/0178276 A1    Jul. 24, 2008

(51) Int. Cl.
*H04L 29/06* (2006.01)
*H04L 9/32* (2006.01)
*G06F 7/04* (2006.01)
*G06F 15/16* (2006.01)
*G06F 17/30* (2006.01)

(52) U.S. Cl. .................. 713/169; 713/152; 726/10; 726/14

(58) Field of Classification Search .......... 713/152, 713/169; 726/10, 14
See application file for complete search history.

(56) References Cited

U.S. PATENT DOCUMENTS

| | | | |
|---|---|---|---|
| 2003/0005280 A1 | 1/2003 | Bobde et al. | 713/150 |
| 2003/0018765 A1 | 1/2003 | Muhlestein et al. | 709/223 |
| 2004/0210767 A1 | 10/2004 | Sinclair et al. | 713/201 |
| 2005/0149726 A1 | 7/2005 | Joshi et al. | 713/164 |
| 2005/0216555 A1 | 9/2005 | English et al. | 709/204 |
| 2005/0228981 A1 | 10/2005 | Gavrilov et al. | 713/100 |
| 2006/0184646 A1 | 8/2006 | Schmidt et al. | 709/218 |
| 2006/0185021 A1 | 8/2006 | Dujari | 726/27 |
| 2006/0195476 A1 | 8/2006 | Nori et al. | 707/104.1 |

OTHER PUBLICATIONS

Microsoft TechNet, "Logon and Authentication Technologies". Mar. 2003, http://technet.microsoft.com/en-us/library/cc780455(WS.10).aspx.*
Adam Shostack, "An Overview of SSL (version 2)" May 1995, http://www.homeport.org/~adam/ssl.html.*
DeVoto, A., "Security Elements of IIS 6.0", *GIAC Security Essentials Certification (GSEC) Practical Assignment Version 1.4b, Option 1*, 2003, http://cnscenter.future.co.kr/resource/security/os/1240.pdf, 19 pages.
Groot, S., "The Kerberos Authentication Protocol", Jun. 23, 2005, http://www.liacs.nl/~sgroot/kerberos.pdf, 17 pages.

* cited by examiner

*Primary Examiner*—Michael J Simitoski
(74) *Attorney, Agent, or Firm*—Woodcock & Washburn LLP

(57) ABSTRACT

NTLM compliant clients and servers are mutually authenticated in accordance with the Kerberos authentication protocol without migrating the clients or servers to Kerberos. With an RPC framework, a target name is generated from the server host name. The target name includes an indication that mutual authentication is to be accomplished. During the initial stages of the RPC session, the target name is sent to the server. If the server recognizes the target name, the client and server are mutually authenticated in accordance with the Kerberos protocol. If the server does not recognize the target name, the client is authenticated in accordance with the NTLM authentication protocol.

18 Claims, 4 Drawing Sheets

US 7,827,405 B2

MECHANISM FOR UTILIZING KERBEROS FEATURES BY AN NTLM COMPLIANT ENTITY

TECHNICAL FIELD

The technical field relates generally to computer processing and more specifically to computer security.

BACKGROUND

Two known authentication protocols are NTLM (an acronym for NT LAN Manager) and Kerberos (named after the Greek mythological three-headed guard dog of Hades). Kerberos is generally considered to be more secure than NTLM. In a typical client-server configuration, NTLM provides authentication of the client. Kerberos, on the other hand, provides mutual authentication: authentication of the client and the server. NTLM is older than Kerberos, thus, many legacy systems are NTLM compliant. Although system administrators would prefer to migrate to a more secure protocol, they tend to resist migrating from NTLM to Kerberos because the migration can be difficult, tedious, time consuming, and generally considered a hardship. Also, to migrate, applications need to be retrofitted or rewritten to use Kerberos correctly. In many cases this is not practical because applications are no longer owned by anyone (e.g., the publisher of the application went out of business or no longer supports the application), or the companies involved do not have the security knowledge to make the changes. Thus, many systems having NTLM compliant clients can not take advantage of Kerberos-like features, such as mutual authentication.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A mechanism, referred to as negoization, allows RPC (remote procedure call) conformant applications utilizing NTLM to utilize Kerberos-like authentication features. Negoization allows mutual authentication and delegation between NTLM compliant clients and servers. In an example client-server configuration, negoization causes RPC to manufacture a targetname from the server hostname passed as part of connection information. If the server has been negoized (contains negoization software), the target name is used to enable Kerberos-like mutual authentication of the client and server. If the client-server have not been negoized, authentication is performed in accordance with NTLM. The negoization mechanism enables applications that do not specify the server's target principal name to use Kerberos. The negoization mechanism allows the use of Kerberos with legacy applications. Prior to this invention, an RPC application has to specify the target principal name in order to use Kerberos. In this mechanism, the granularity of specified target principal names are at the machine level, thus new applications must specify the target principal name to achieve require higher level of granularity.

BRIEF DESCRIPTION OF THE DRAWINGS

The foregoing summary, as well as the following detailed description, is better understood when read in conjunction with the appended drawings. For the purpose of illustrating a mechanism for utilizing Kerberos authentication features by an NTLM compliant entity, there is shown in the drawings exemplary constructions thereof; however, the mechanism for providing a mechanism for utilizing Kerberos authentication features by an NTLM compliant entity is not limited to the specific methods and instrumentalities disclosed.

DETAILED DESCRIPTION OF ILLUSTRATIVE EMBODIMENTS

Figure 1:
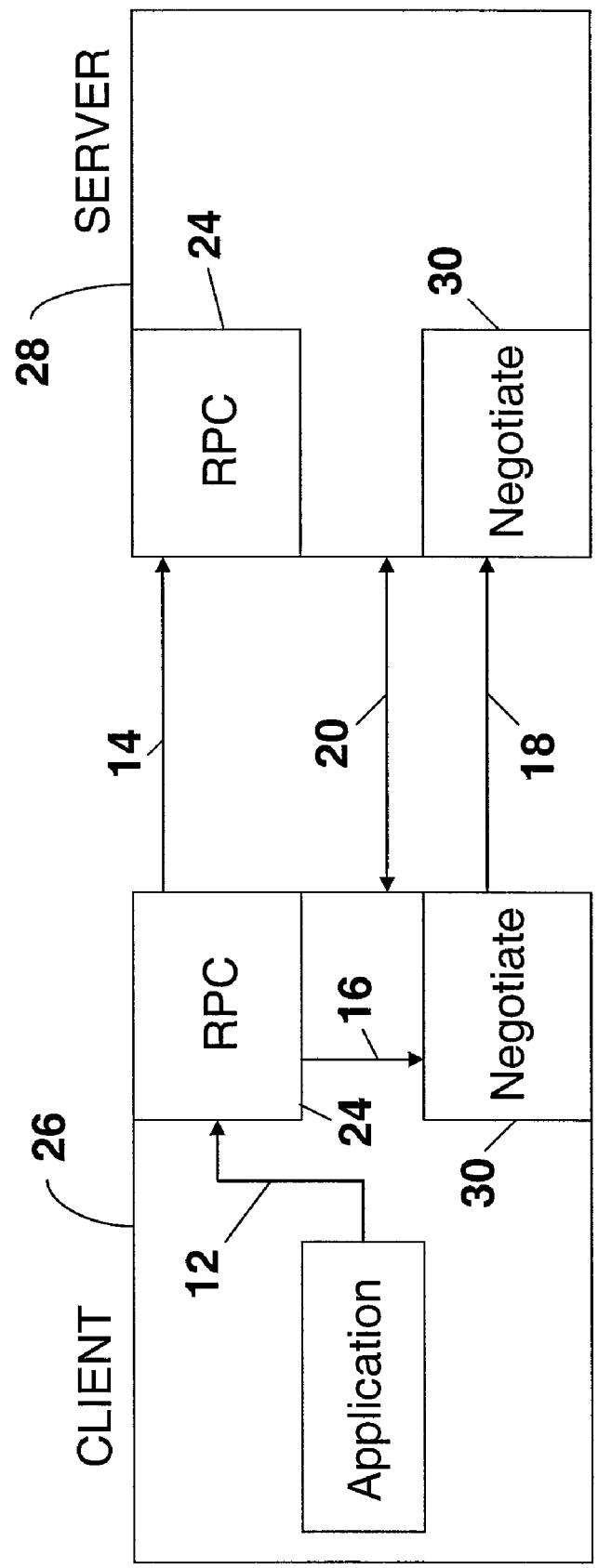
FIG. 1 is a flow diagram of a system and process for allowing utilization of Kerberos authentication features by an NTLM compliant entity.

A mechanism, referred to herein as negoization, provides the ability for entities, such as a processors and/or applications, that are compliant with the NTLM protocol to perform mutual authentication. For the sake of simplicity, descriptions herein are with respect to client processors (clients) and server processors (servers), however applications of the mechanism for providing mutual authentication between NTLM compliant entities are not limited thereto. The mechanism for providing mutual authentication between NTLM compliant entities is applicable to any appropriate processor, process, and/or application.

Remote procedure call (RPC) is a protocol used in client-server configurations. RPC provides means for an application (program) on the client to execute an application on the server, and for an application on the server to execute an application on the client. RPC is commonly initiated by the client. The client sends a message to the server indicating that an application is to be executed, and the server sends a message in response. During the initial stages of an RPC session, the client and/or server can be authenticated. Authentication is the process of verifying the identity of an entity (e.g., the client, the server, a processor, a user). Two types of authentication protocols are NTLM and Kerberos. Negotiate is a mechanism that manages Kerberos, NTLM, and capable of managing as yet to be determined protocols.

NTLM is an authentication protocol that uses a challenge-response sequence between the client and the server. Within the RPC framework, the client provides to RPC (an RPC compliant application), the host name of the server. RPC opens up a port to the server having the host name and establishes a communication path between the client and the server. NTLM authentication provides primarily client authentication. That is, NTLM allows the client's identity to be proven to the server, but the server's identity is not proven to the client. In the case when the server is joined to a trusted domain, the server is not authenticated beyond the fact that the server is joined to a domain name that trusts the account domain of the client. If the client is authenticated, RPC transfers control back to the client and server for communications therebetween.

A Kerberos system generally is considered more secure, more performant, and more feature-rich than NTLM. Kerberos is an authentication protocol used to perform mutual authentication of the client and the server. Kerberos is a computer network authentication protocol that allows entities communicating over an insecure network to prove their identity to one another in a secure manner. Kerberos prevents eavesdropping or replay attacks, and ensures the integrity of data. Kerberos provides mutual authentication where both the client and the server verify each other's identity. Kerberos builds on symmetric key cryptography and requires a trusted third party.

Kerberos includes two functional parts: an Authentication Server (AS) and a Ticket Granting Server (TGS). Kerberos works on the basis of "tickets" which serve to prove the identity of users. Using Kerberos, a client can prove its identity to use the resources of a server. Kerberos maintains a database of secret keys; each entity on the network, whether a client or a server, shares a secret key known only to itself and to Kerberos. Knowledge of this key serves to prove an entity's identity. For communication between two entities, Kerberos generates a session key which the entities can use to secure interactions. Using the Kerberos system, the client authenticates itself to an AS, then demonstrates to the TGS that it is authorized to receive a ticket for a service (and receives it), then demonstrates to the server that it has been approved to receive the service.

FIG. 1 is a flow diagram of a system and process for allowing utilization of Kerberos authentication features by an NTLM compliant entity. At step 12, the client 26 provides a host name to RPC 24. More specifically, an application or the like of the client 26 provides a host name to RPC 24. The host name comprises the name of the server 28 to be utilized for communication between the client 26 and the server 28. RPC 24 utilizes the host name to generate a target name. As explained in more detail below, the target name is utilized to allow the negotiate module 30 to determine if the server 28 is negoized. At step 14, RPC 24 opens a port to the server 28 and establishes an RPC endpoint. At step 16, RPC 24 calls the negotiate module 30 to perform authentication. The negotiate module 30 determines, at step 18, if the server 28 had been negoized. An entity is negoized if it contains software that recognizes the target name and can initiate Kerberos-like mutual authentication in response to recognizing the target name. From the client's perspective, the server is negoized if its targetname is recognized as valid by the underlying authentication package (Kerberos in this case, but limited thereto). For Kerberos, a server entity is assumed to be negoized if the TGS recognizes the targetname (verifiable by producing a service ticket when the client asks). If the server 28 has been negoized, the negotiate module 30 authenticate via Kerberos-like authentication. That is, the client 26 and the server 28 are authenticated. If the server 28 has not been negoized, only the client 26 is authenticated utilizing NTLM. Upon authentication, whether single or mutual, RPC transfers control to the client 26 and the server 28 for communication therebetween, at step 20.

It is to be understood that the configuration depicted in FIG. 1 is exemplary. For example, RPC 24 can reside in the client 26, in the server 28, in a separate processor, or a combination thereof. The negotiate module 30 can reside in the client 26, in the server 28, in a separate processor, or a combination thereof. Each of the client 26, the server 28, the RPC 24, and negotiate module 30 can comprise any appropriate entity. For example, each of the client 26, the server 28, the RPC 24, and negotiate module 30 can comprise a processor, an application, or a combination thereof.

Figure 2:
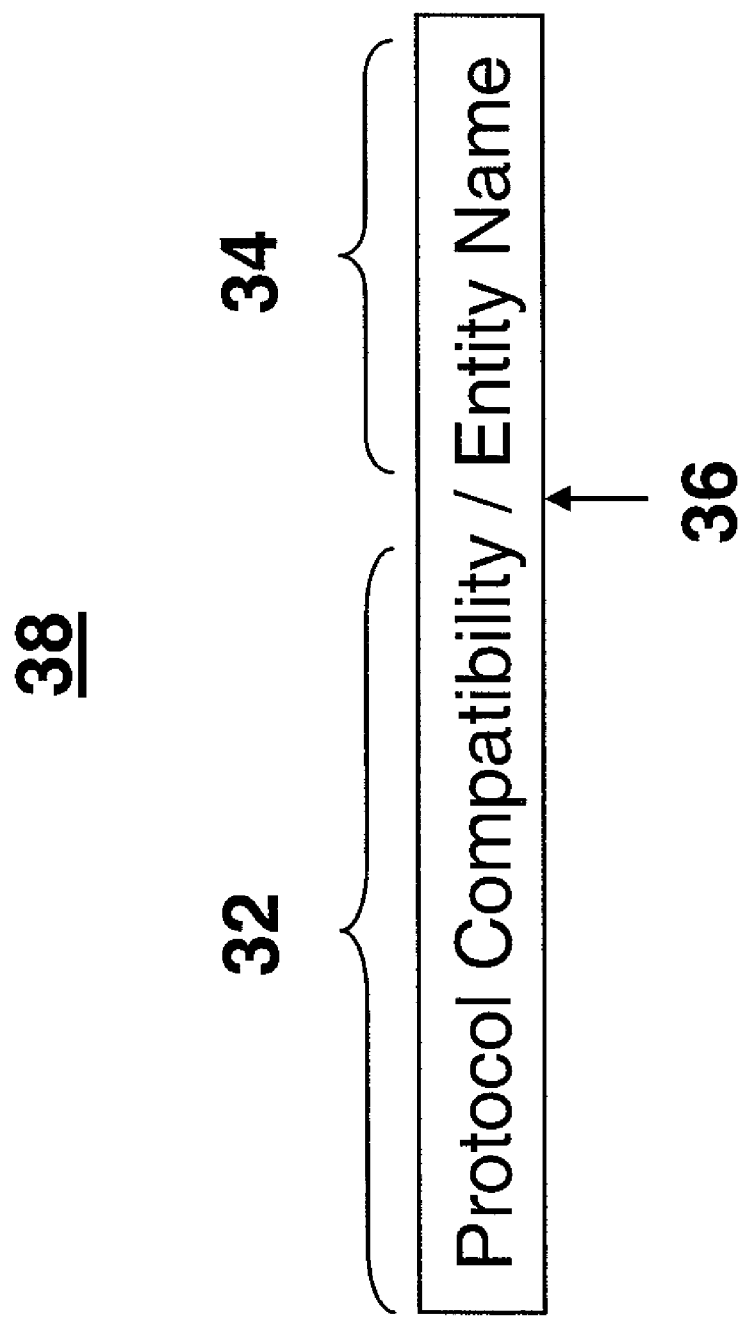
FIG. 2 is a depiction of an example format of a target name.

FIG. 2 is a depiction of an example format of a target name 38. The target name 38 comprises a first portion 32, a second portion 34, and a separator 36. The separator 36 separates the first portion 32 from the second portion 34. The separator 36 can comprise any appropriate separator that is capable of distinguishing the first portion 32 from the second portion 34, such as a textual character or characters (e.g., "/", "*"), a graphical character, a word, a phrase, or the like. The first portion 32 comprises an indication of compatibility with an authentication protocol and the second portion comprises an indication of the entity name (e.g., server name). The first portion is a keyword that is understood by both the client (because it constructs it) and the server (who interprets it). The keyword can be any appropriate keyword that is agreed upon a priori by the software and is unique to this protocol. If the keyword were already in use by other Kerberos-authenticated applications, a server might be viewed as negoized even though it really isn't. Different protocol compatibilities can result in different targetname keywords. For example, if a current version of Negoization includes only Kerberos, the targetname can be Negoization-Kerberos, but if an SSL is added to the mix, it could be Negoization-Kerberos-SSL. The first portion 32 could comprise the term "Kerberos," or the term "Negotiation," which the negotiation module 30 on the server 28 would recognize and thus allow initiation of mutual authentication. The target name 38 that is passed by RPC 24 to the server 28 enables the negotiation module 30 to determine if the server 28 has been negoized or if the server 28 has not been negoized. In an example embodiment, the first portion 32 is stored, or registered, with the server when negoization software is loaded into the server. Thus, in response to receiving the target name, the negoized server will recognize the target name and initiate authentication.

If the client 26 recognizes the indication of compatibility with an authentication protocol (e.g., portion 32), Kerberos-like authentication is attempted. The target name was already registered with a Kerberos TGS when the server 28 was installed. In an example configuration, the target name 38 comprises a Kerberos service principle name (SPN). The Kerberos system will be able to get a ticket to servers that have a registered target name (e.g., registered SPN). If Kerberos fails to get a ticket, the negotiate module 30 will perform NTLM authentication on the client 26. Thus, clients can be authenticated regardless of whether the server is Kerberos compatible or not Kerberos compatible. If the Kerberos system is able to get a ticket, Kerberos knows that the server has been negoized.

In an example embodiment, to accommodate encrypted tickets that have been encrypted with a cryptographic key of a user of the server, the Kerberos implementation resides in a trusted process on the client, such as the local security authority subsystem (LSASS), or the like. Thus, the encrypted ticket is decrypted using the user's cryptographic key.

Figure 3:
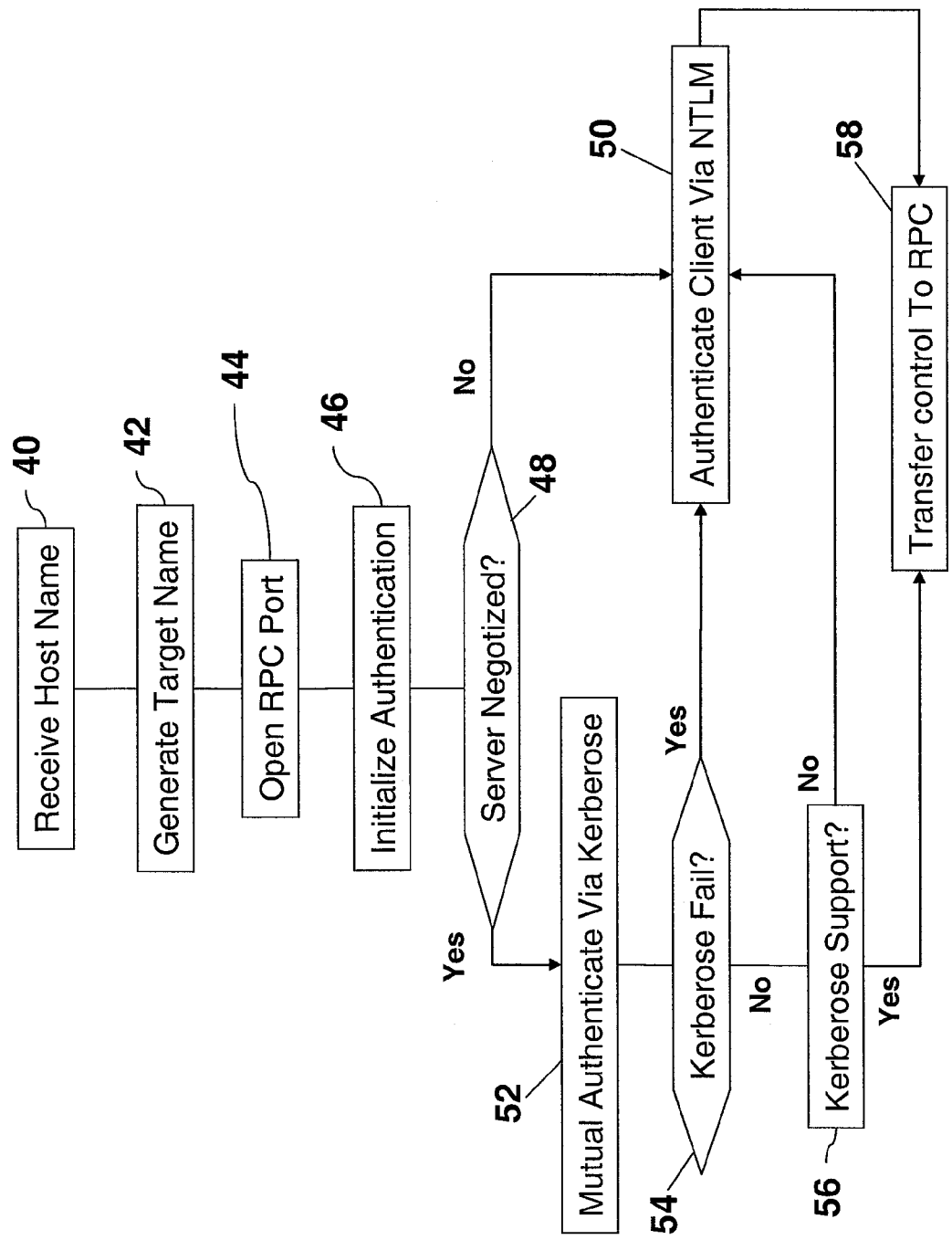
FIG. 3 is a flow diagram of an example process for providing Kerberos mutual authentication of NTLM compliant entities.

FIG. 3 is a flow diagram of an example process for providing Kerberos mutual authentication of NTLM compliant entities. The host name is received at step 40. In an example embodiment, step 40 is called by RPC or other appropriate middle-tier component. As described above, a target name is generated from the host name at step 42. At step 44, an RPC port is opened between the client and the server. Authentication is initialized at step 46. To determine if Kerberos mutual authentication can be accomplished on the client and the server, or if NTLM authentication can be accomplished on the client, it is determined, at step 48 if the server has been negoized. The server is negoized if it comprises software that recognizes the target name, specifically the indication of authentication protocol compatibility, and that can enable authentication in response to receiving the target name.

If the server has not be negoized (step 48), the client is authenticated, at step 50, in accordance with the NTLM authentication protocol, and the server is not authenticated. Control of communication between the client and the server is passed to RPC at step 58. If the server has been negoized (step 48), mutual authentication of the client and the server is accomplished in accordance with the Kerberos protocol at step 52. If Kerberos authentication fails (step 54) or the server can not support Kerberos authentication (step 56), the process proceeds to step 50, wherein the client is authenticated in accordance with the NTLM authentication protocol and control is passed to RPC at step 58.

Various client-server scenarios are possible. For example, both an NTLM compatible client and an NTLM compatible server could not be negoized. That is neither the client nor the server has software that can recognize the target name and initiate authentication in response to receiving the target name. In this scenario, operations will not be changed. In another scenario, if the client is negoized and the server is not negoized, the client is authenticated in accordance with the NTLM protocol. If the server is negoized and the client is not negoized, the client is authenticated in accordance with the NTLM protocol and the server is authenticated in accordance with the Kerberos protocol. If both the client and server are negoized, both the client and server are authenticated in accordance with the Kerberos protocol.

Figure 4:
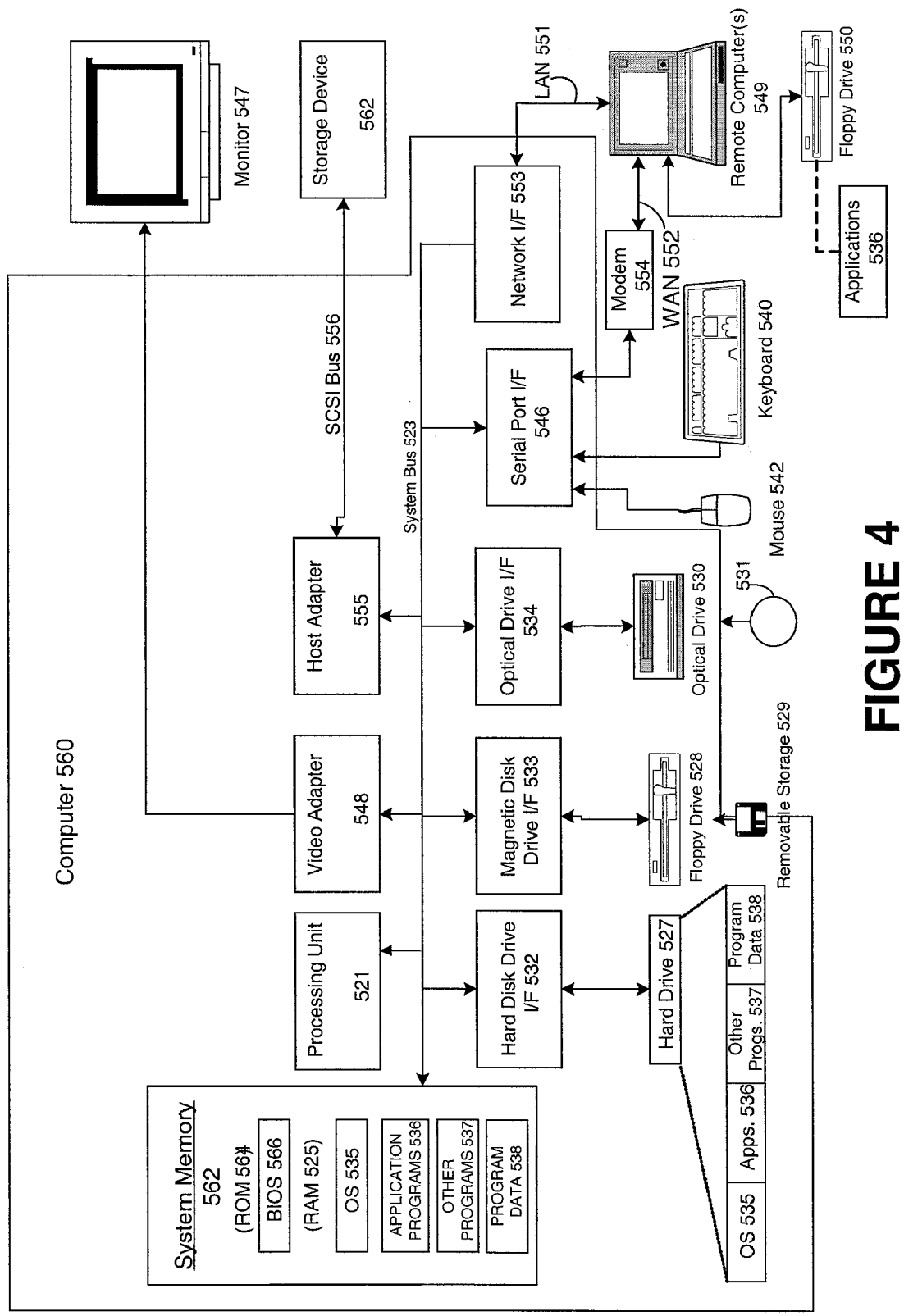
FIG. 4 is a depiction of a suitable computing environment in which a mechanism for utilizing Kerberos features by an NTLM compliant entity can be implemented.

FIG. 4 and the following discussion provide a brief general description of a suitable computing environment in which a mechanism for utilizing Kerberos features by an NTLM compliant entity can be implemented. Although not required, various aspects of a mechanism for utilizing Kerberos features by an NTLM compliant entity can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of a mechanism for utilizing Kerberos features by an NTLM compliant entity can be practiced with other computer system configurations, including hand held devices, multi processor systems, microprocessor based or programmable consumer electronics, network PCs, minicomputers, mainframe computers, and the like. Further, a mechanism for utilizing Kerberos features by an NTLM compliant entity also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with a mechanism for utilizing Kerberos features by an NTLM compliant entity as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 4, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM)

525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 4 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 4. The logical connections depicted in FIG. 4 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of a mechanism for utilizing Kerberos features by an NTLM compliant entity are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing a mechanism for utilizing Kerberos features by an NTLM compliant entity, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a mechanism for utilizing Kerberos features by an NTLM compliant entity.

The program(s) can be implemented in assembly or machine language, if desired. In any case, the language can be a compiled or interpreted language, and combined with hardware implementations. The methods and apparatuses for implementing a mechanism for utilizing Kerberos features by an NTLM compliant entity also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of a mechanism for utilizing Kerberos features by an NTLM compliant entity. Additionally, any storage techniques used in connection with a mechanism for utilizing Kerberos features by an NTLM compliant entity can invariably be a combination of hardware and software.

While a mechanism for utilizing Kerberos features by an NTLM compliant entity has been described in connection with the example embodiments of the various figures, it is to be understood that other similar embodiments can be used or modifications and additions can be made to the described embodiments for performing the same functions of a mechanism for utilizing Kerberos features by an NTLM compliant entity without deviating therefrom. Therefore, a mechanism for utilizing Kerberos features by an NTLM compliant entity as described herein should not be limited to any single embodiment, but rather should be construed in breadth and scope in accordance with the appended claims.

What is claimed:

1. A processor implemented method for authenticating at least one of a first entity and a second entity, the method comprising:
receiving a first name indicative of the first entity;
generating, via the processor, a second name indicative of the first entity, the second name comprising:
an indication of the first name; and
an indication of compatibility with a first authentication protocol;
determining, utilizing the second name, if the first entity is compatible with the first authentication protocol, wherein determining if the first entity is compatible with the first authentication protocol comprises attempting to provide a Kerberos ticket to the first entity;
when the first entity is compatible with the first authentication protocol:
registering the second name in accordance with the first authentication protocol;
authenticating the first entity in accordance with the first authentication protocol; and
authenticating the second entity in accordance with the first authentication protocol; and
when the first entity is not compatible with the first authentication protocol:
authenticating the second entity in accordance with a second authentication protocol.

2. A method in accordance with claim 1, further comprising determining that the first entity is compatible with the first authentication protocol when the first entity recognizes the indication of compatibility with the first authentication protocol in the second name.

3. A method in accordance with claim 1, wherein the first authentication protocol comprises a Kerberos authentication protocol.

4. A method in accordance with claim 1, wherein the second authentication protocol comprises an NTLM authentication protocol.

5. A method in accordance with claim 1, wherein the steps of authenticating the first entity in accordance with the first authentication protocol, authenticating the second entity in accordance with the first authentication protocol, and authenticating the second entity in accordance with the second authentication protocol, are conformant with a remote procedure protocol.

6. A method in accordance with claim 1, wherein:
when the first entity accepts the Kerberos ticket:
the second name is registered with a Kerberos authentication protocol;
the first entity is authenticated in accordance with the Kerberos authentication protocol; and
the second entity is authenticated in accordance with the Kerberos authentication protocol; and
when the first entity does not accept the Kerberos ticket:
the second entity is authenticated in accordance with the NTLM authentication protocol.

7. A method in accordance with claim 6, wherein the Kerberos ticket comprises an encrypted Kerberos ticket encrypted with a cryptographic key associated with a host of the second entity, the method further comprising decrypting the encrypted Kerberos ticket.

8. A method in accordance with claim 1, wherein:
the first entity comprises at least one of an application and a processor; and
the second entity comprises at least one of an application and a processor.

9. An authentication system comprising a processor for authenticating at least one of a first entity and a second entity, the system comprising:
a first application configured to:
receive, from the second entity, a first name indicative of the first entity;
generate, via the processor, a second name indicative of the first entity, the second name comprising:
an indication of the first name; and
an indication of compatibility with a first authentication protocol; and
a second application configured to:
determine, utilizing the second name, if the first entity is compatible with the first authentication protocol, wherein to determine if the first entity is compatible with the first authentication protocol, the second application is further configured to attempt to provide a Kerberos ticket to the first entity;
when the first entity is compatible with the first authentication protocol:
register the second name in accordance with the first authentication protocol;
authenticate the first entity in accordance with the first authentication protocol, wherein authenticating the first entity is conformant with a remote procedure call; and
authenticate the second entity in accordance with the first authentication protocol, wherein authenticating the second entity is conformant with the remote procedure call; and
when the first entity is not compatible with the first authentication protocol:
authenticate the second entity in accordance with a second authentication protocol.

10. A system in accordance with claim 9, wherein the first entity is compatible with the first authentication protocol when the first entity recognizes the indication of compatibility with the first authentication protocol in the second name.

11. A system in accordance with claim 9, wherein the first authentication protocol comprises a Kerberos authentication protocol.

12. A system in accordance with claim 9, wherein the second authentication protocol comprises an NTLM authentication protocol.

13. A system in accordance with claim 9, wherein:
when the first entity accepts the Kerberos ticket:
the second name is registered in accordance with a Kerberos authentication protocol;
the first entity is authenticated in accordance with the Kerberos authentication protocol; and
the second entity is authenticated in accordance with the Kerberos authentication protocol; and
when the first entity does not accept the Kerberos ticket:
the second entity is authenticated in accordance with the NTLM authentication protocol.

14. A system in accordance with claim 13, wherein the Kerberos ticket comprises an encrypted Kerberos ticket encrypted with a cryptographic key associated with a host of the second entity, the method further comprising decrypting the encrypted Kerberos ticket.

15. A system in accordance with claim 9, wherein:
the first entity comprises at least one of an application and a processor;
the second entity comprises at least one of an application and a processor;
the first application comprises at least one of:
an application of the first entity; and a remote procedure call protocol compliant application.

16. A computer-readable storage medium, wherein the computer-readable storage medium is not a signal, having stored thereon computer-executable instructions for providing authentication of at least one of a first entity and a second entity, comprising the steps of:
    receiving a first name indicative of a first entity to be authenticated;
    generating a second name indicative of the first entity, the second name comprising:
        an indication of the first name; and
        an indication of a first authentication protocol; and
    determining if the first entity is compatible with the first authentication protocol, wherein determining if the first entity is compatible with the first authentication protocol comprises attempting to provide a Kerberos ticket to the first entity;
    when the first entity is compatible with the first authentication protocol:
        registering the second name in accordance with the first authentication protocol;
        authenticating the first entity in accordance with the first authentication protocol; and
        authenticating the second entity in accordance with the first authentication protocol; and
    when the first entity is not compatible with the first authentication protocol:
        authenticating the second entity in accordance with a second authentication protocol.

17. A computer-readable storage medium in accordance with claim 16, wherein:
    the first authentication protocol comprises a Kerberos authentication protocol; and
    the second authentication protocol comprises an NTLM authentication protocol.

18. A computer-readable storage medium in accordance with claim 16, wherein the steps of authenticating the first entity in accordance with the first authentication protocol, authenticating the second entity in accordance with the first authentication protocol, and authenticating the second entity in accordance with the second authentication protocol, are conformant with a remote procedure protocol.

* * * * *